(12) United States Patent
Tanaka

(10) Patent No.: US 7,173,731 B2
(45) Date of Patent: Feb. 6, 2007

(54) APPARATUS AND METHOD FOR IMAGE-PROCESSING AND COMPUTER PROGRAM PRODUCT FOR IMAGE-PROCESSING

(75) Inventor: Yoshinori Tanaka, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 969 days.

(21) Appl. No.: 09/878,272

(22) Filed: Jun. 12, 2001

(65) Prior Publication Data

US 2002/0003897 A1    Jan. 10, 2002

(30) Foreign Application Priority Data

Jun. 14, 2000 (JP) .............................. 2000-178823

(51) Int. Cl.
*G06F 15/00* (2006.01)

(52) U.S. Cl. ...................... 358/1.16; 358/1.2; 382/164; 382/199

(58) Field of Classification Search ............... 358/1.16; 382/164, 199
See application file for complete search history.

(56) References Cited

U.S. PATENT DOCUMENTS

| | | | | |
|---|---|---|---|---|
| 4,307,377 A | * | 12/1981 | Pferd et al. ................. | 382/242 |
| 4,777,651 A | * | 10/1988 | McCann et al. ............. | 382/242 |
| 5,010,401 A | * | 4/1991 | Murakami et al. ..... | 375/240.16 |
| 5,241,609 A | * | 8/1993 | Hasebe et al. ............... | 382/163 |
| 5,293,469 A | * | 3/1994 | Outa et al. .................. | 345/660 |
| 5,347,598 A | * | 9/1994 | Ogawa ........................ | 382/100 |
| 5,353,397 A | * | 10/1994 | Yokoyama et al. .......... | 715/502 |
| 5,388,166 A | * | 2/1995 | Onozawa ..................... | 382/269 |
| 5,396,582 A | * | 3/1995 | Kahkoska ..................... | 358/1.3 |
| 5,432,898 A | * | 7/1995 | Curb et al. .................. | 345/443 |
| 5,629,752 A | * | 5/1997 | Kinjo ............................ | 355/35 |
| 5,642,476 A | * | 6/1997 | Turner ......................... | 345/443 |
| 5,715,331 A | * | 2/1998 | Hollinger ..................... | 382/199 |
| 5,751,848 A | * | 5/1998 | Farrell ......................... | 382/172 |

(Continued)

FOREIGN PATENT DOCUMENTS

JP    06-195421    7/1994

OTHER PUBLICATIONS

Computer translation of Japanese Patent Document No. 06-195421,Jul. 15, 1994.*

(Continued)

*Primary Examiner*—Twyler Lamb
*Assistant Examiner*—Mark R. Milia
(74) *Attorney, Agent, or Firm*—Buchanan Ingersoll & Rooney PC

(57) ABSTRACT

The image processing apparatus of this invention has a vector conversion unit that converts raster data obtained by scanning graphics into vector data, an enclosed area extraction unit that extracts enclosed areas when the enclosed areas consist of line graphics, an enclosed area extracting unit that extracts the enclosed areas, a vector color detecting unit that detects colors of line graphics, and an enclosed area color detection unit that detects the colors inside the enclosed areas, wherein the vector data and the color information inside an enclosed area are handled together as a package. The line widths of line graphics are detected by a line width detection unit. Therefore, the information concerning the vector data and the line width of a line graphic are also handled together as a package.

32 Claims, 16 Drawing Sheets

U.S. PATENT DOCUMENTS

| | | | | |
|---|---|---|---|---|
| 5,761,328 A * | 6/1998 | Solberg et al. | | 382/113 |
| 5,845,304 A * | 12/1998 | Iijima | | 715/530 |
| 5,848,185 A * | 12/1998 | Koga et al. | | 382/173 |
| 5,960,109 A * | 9/1999 | Shiau | | 382/164 |
| 6,018,352 A * | 1/2000 | Saito | | 345/678 |
| 6,134,021 A * | 10/2000 | Silverbrook | | 358/1.18 |
| 6,134,338 A * | 10/2000 | Solberg et al. | | 382/113 |
| 6,151,424 A * | 11/2000 | Hsu | | 382/294 |
| 6,166,745 A * | 12/2000 | Saito | | 345/441 |
| 6,226,400 B1 * | 5/2001 | Doll | | 382/163 |
| 6,324,300 B1 * | 11/2001 | Doll | | 382/162 |
| 6,388,757 B1 * | 5/2002 | Koga | | 358/1.11 |
| 6,466,229 B1 * | 10/2002 | Nagao | | 345/621 |
| 6,469,805 B1 * | 10/2002 | Behlok | | 358/1.9 |
| 6,480,196 B1 * | 11/2002 | Harrington | | 345/443 |
| 6,507,872 B1 * | 1/2003 | Geshwind | | 709/236 |
| 6,556,711 B2 * | 4/2003 | Koga et al. | | 382/173 |
| 6,633,890 B1 * | 10/2003 | Laverty et al. | | 707/203 |
| 6,665,439 B1 * | 12/2003 | Takahashi | | 382/199 |
| 6,728,399 B1 * | 4/2004 | Doll | | 382/164 |
| 6,734,986 B1 * | 5/2004 | Kuroi et al. | | 358/1.16 |
| 6,738,158 B1 * | 5/2004 | Lupien et al. | | 358/1.16 |
| 6,771,813 B1 * | 8/2004 | Katsuyama | | 382/165 |
| 6,781,590 B2 * | 8/2004 | Katsura et al. | | 345/538 |
| 6,795,576 B2 * | 9/2004 | Uchida et al. | | 382/164 |
| 6,804,394 B1 * | 10/2004 | Hsu | | 382/173 |
| 2002/0064307 A1 * | 5/2002 | Koga et al. | | 382/176 |

OTHER PUBLICATIONS

Japanese Patent Abstract of Document No. 04346332A, Dec. 2, 1992.*

Japanese Patent Abstract of Document No. 59128662A, Jul. 24, 1984.*

Japanese Patent Abstract of Document No. 62189592A, Aug. 19, 1987.*

Japanese Patent Abstract of Document No. 63080242A, Apr. 11, 1988.*

* cited by examiner

| | STACK ||
|---|---|---|
| | GROUP OF VECTORS FROM START POINT UP TO VECTOR-IN-QUESTION | GROUP OF CONNECTING VECTORS |
| 1 | $\overrightarrow{AB}$ | $\overrightarrow{BE}$ |
| 2 | | |
| 3 | | |

FIG.11

| | STACK | |
|---|---|---|
| | GROUP OF VECTORS FROM START POINT UP TO VECTOR-IN-QUESTION | GROUP OF CONNECTING VECTORS |
| 1 | $\overrightarrow{AB},\overrightarrow{BE}$ | $\overrightarrow{EG},\overrightarrow{EH}$ |
| 2 | | |
| 3 | | |
| | | |

FIG.12

| | STACK | |
|---|---|---|
| 1 | GROUP OF VECTORS FROM START POINT UP TO VECTOR-IN-QUESTION | GROUP OF CONNECTING VECTORS |
| 2 | $\overrightarrow{AB},\overrightarrow{BE}$ | $\overrightarrow{EG},\overrightarrow{EH}$ |
| 3 | $\overrightarrow{AB},\overrightarrow{BE},\overrightarrow{EF},\overrightarrow{FG},\overrightarrow{GE}$ | $\overrightarrow{EF},\overrightarrow{EH}$ |
| | | |
| | | |

FIG.13

| | STACK | |
|---|---|---|
| | GROUP OF VECTORS FROM START POINT UP TO VECTOR-IN-QUESTION | GROUP OF CONNECTING VECTORS |
| 1 | $\overrightarrow{AB}, \overrightarrow{BE}$ | $\overrightarrow{EG}, \overrightarrow{EH}$ |
| 2 | $\overrightarrow{AB}, \overrightarrow{BE}, \overrightarrow{EF}, \overrightarrow{FG}, \overrightarrow{GE}$ | $\overrightarrow{EH}$ |
| 3 | | |
| | | |

FIG.14

| | STACK | |
|---|---|---|
| | GROUP OF VECTORS FROM START POINT UP TO VECTOR-IN-QUESTION | GROUP OF CONNECTING VECTORS |
| 1 | $\overrightarrow{AB}, \overrightarrow{BE}$ | $\overrightarrow{EH}$ |
| 2 | | |
| 3 | | |
| | | |

FIG.22 RELATED ART
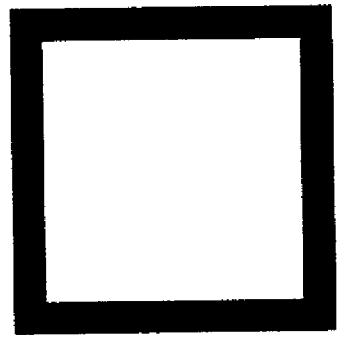
 VECTOR CONVERSION
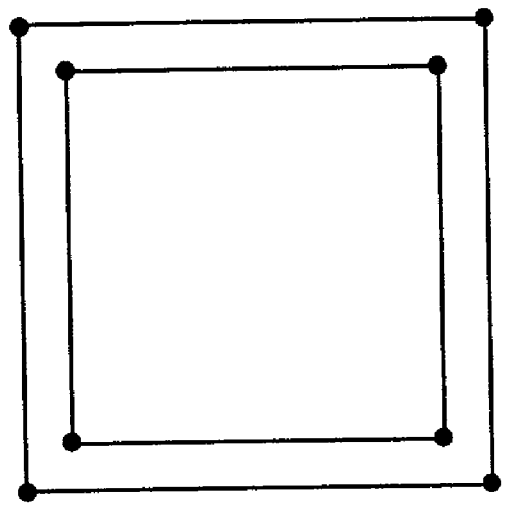

APPARATUS AND METHOD FOR IMAGE-PROCESSING AND COMPUTER PROGRAM PRODUCT FOR IMAGE-PROCESSING

This application is based on Japanese Patent Application No. 2000-178823 filed on Jun. 14, 2000, the contents of which are hereby incorporated by reference.

BACKGROUND OF THE INVENTION

1. Field of the Invention

The present invention relates to a image-processing apparatus and its method intended to generate vector data based on raster data obtained by scanning graphic images as well as a computer program product storing image-processing programs for the same.

2. Description of Related Art

Scanning of a document generates raster data that expresses an image by a group of dots. A technology for converting this raster data into vector data (vector converting technology) is known. Once raster data is converted to vector data, it can be easily moved, scaled up or down, and rotated.

The Publication of Japanese Patent Application No. 6-195421 disclosed a technology for extracting line graphics (contour lines of graphic images) from raster data and a technology to generate vector data along the extracted line graphics. According to the technology shown on this publication, it executes the process of detecting the colors of the line graphics and covering the entire closed area surrounded by each line graphic with the color of the particular line graphic.

The technology of the publication is to extract line graphics from raster data, prepare vector data, and detect the color of each line graphic. However, the technology of the publication does not handle the information concerning the color within an enclosed area surrounded by a line graphic. Therefore, if the color of an enclosed area surrounded by a black contour line is green, it was not capable of handling the vector data generated along the black contour line and the information concerning the color (green) within the enclosed area as a package.

As can be seen from the above, while the prior art is able of showing line graphics extracted from raster data as vector data, it does not store the information concerning the colors of enclosed areas related to the vector data. Therefore, it causes a problem that it cannot recreate the colors of the enclosed areas surrounded by the line graphics in reusing the vector data, thus reducing the usefulness of the data.

Moreover, the technology disclosed by the publication does not take the line widths of line graphics into consideration when it extracts the line graphics from raster data. Consequently, when it extracts a line graphic from raster data and executes a vector conversion, it generates two enclosed areas, namely one that is surrounded by the outer edge of the frame line and another that is surrounded by the inner edge of the line as shown in FIG. 22. Consequently, when such vector data are used to perform a process of scaling up or down the images, it causes a problem that the line widths vary as a result of the above-mentioned process.

SUMMARY OF THE INVENTION

It is an object of the invention to provide a image processing apparatus and method to convert raster data obtained by scanning graphic images into vector data and, if those extracted line graphics form enclosed areas, to enable to handle information of colors within the enclosed areas.

It is another object of the invention to provide a image processing apparatus and method to solve the problem that the line width changes when a line graphic is scaled up or down.

According to an aspect of the invention, an image-processing apparatus has a memory that stores raster data obtained by scanning graphic image; and a processor connected to said memory. The processor extracts line graphics based on the raster data, and generates vector data along the extracted line graphics. The processor detects information concerning line widths of the extracted line graphics. The processor extracts an enclosed area surrounded by the extracted line graphics, detects information concerning a color within the extracted enclosed area.

According to another aspect of the invention, an image-processing method has the steps of receiving raster data obtained by scanning graphic image, extracting line graphics based on the raster data, generating vector data along the extracted line graphics, detecting information concerning line widths of the extracted line graphics, extracting an enclosed area surrounded by the extracted line graphics, and detecting information concerning a color within the extracted enclosed area.

According to still another aspect of the invention, an image-processing method has the steps of receiving raster data obtained by scanning graphic image, extracting line graphics based on the raster data, generating vector data along the extracted line graphics, detecting information concerning line widths and a color within the extracted line graphics, extracting an enclosed area surrounded by the extracted line graphics, detecting information concerning a color within the extracted enclosed area, and storing information the vector data, information concerning the line widths and the color of the line graphics, and information concerning the color within the enclosed area.

According to a further aspect of the invention, a program product for image processing, said program product causing a computer to execute the procedures of receiving raster data obtained by scanning graphic image, extracting line graphics based on the raster data, generating vector data along the extracted line graphics, detecting information concerning line widths of the extracted line graphics, extracting an enclosed area surrounded by the extracted line graphics, and detecting information concerning a color within the extracted enclosed area.

BRIEF DESCRIPTION OF THE DRAWINGS

FIG. 11 is a diagram that shows the data stored in a stack.

FIG. 12 is a diagram that shows the data stored in a stack.

FIG. 13 is a diagram that shows the data stored in a stack.

FIG. 14 is a diagram that shows the data stored in a stack.

FIG. 22 is a diagram that shows the contents of the vector conversion of the prior art.

DESCRIPTION OF THE PREFERRED EMBODIMENTS

Figure 1:
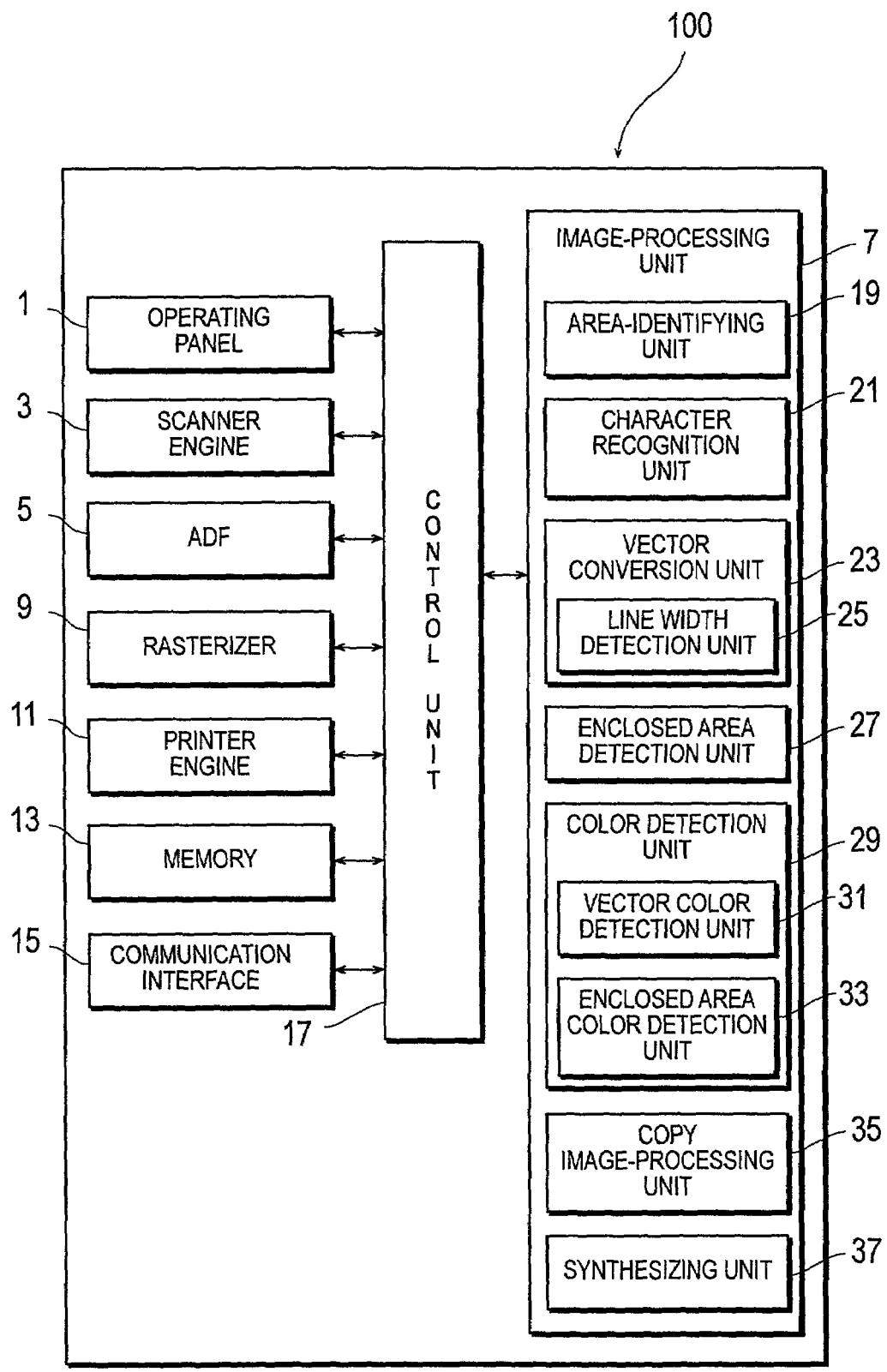
FIG. 1 is a block diagram that shows the constitution of a digital copying machine that corresponds to the first embodiment of the invention.

The embodiments of this invention will be described below referring to the drawings.

(First Embodiment)

FIG. 1 is a block diagram that shows the contents of a digital copying machine that corresponds to the first embodiment of the invention. In the first embodiment, the image-processing device according to the invention is constituted as a digital copying machine.

A digital copying machine 100 is a compound mode machine having a scanner function and a printer function. The digital copying machine 100 has a vector conversion function. The vector conversion function automatically converts graphics in color documents into accurate vector data with high accuracies using limited amounts of data. The vector conversion function of the invention not only converts line graphics into vector data as describe later but also detects line widths of line graphics, extracts one or more enclosed areas, and detects the color of the line graphics and the colors within the enclosed areas, but also is capable of handling the information on the line widths and colors of the line graphics and the colors of the enclosed areas surrounded by the line graphics together with the vector data. Therefore, the vector conversion function according to the present invention is called "advanced vector conversion" throughout this specification to differentiate it from the conventional vector conversion function.

The digital copying machine 100 includes an operating panel 1, a scanner engine 3, an auto document feeder (ADF) 5, an image-processing unit 7, a rasterizer 9, a printer engine 11, a memory 13, a communication interface 15, and a control unit 17.

The operating panel 1 is used for executing various inputs and displays. The scanner engine 3 scans documents to obtain digital image data, i.e., raster data. The ADF 5 transports a document consisting of multiple sheets one sheet at a time to the document set position. The image-processing unit 7 receives the raster data obtained by scanning the document and executes the processing. The rasterizer 9 expands the data obtained by the image-processing and stored in a specified format such as PDF, more specifically the data that contain vector data, into bitmap data (raster data) for the purpose of outputting to the printer. The print engine 11 prints based on the image data in the bitmap format on the printing paper. The memory 13 stores programs and data. The communication interface 15 is used to output the image data (image data file) to the outside via a network (not shown). The control unit 17 controls all the abovementioned units.

Although it is not shown on the drawing, the operating panel 1 contains a touch panel display, a start key, a 10-key pad, and others. The touch panel display displays on its screen the mode currently set up, other selectable modes, the status of the copying machine 100 by means of graphics and messages. The user can switch the copy mode by touching the keys displayed on the screen.

The scanner engine 3 is a scanner engine that can accommodate scanning of color documents. The rasterizer 9 includes a processor such as a rater image processor (RIP). The printer engine 11 is a printer engine that is capable of printing in colors. More specifically, the printer engine 11 corresponds to a laser beam printer engine (LBP) or an inkjet printer engine that can accommodate colors.

The memory 13 includes a ROM, a RAM, and a storage media. The ROM stores programs and data. It is preferable that the ROM corresponds to a flash ROM (also called flash memory) that can be electrically rewritten so that the programs and data can be updated. Various parameters for conducting the image-processing are stored in the ROM. The RAM and the storage media are used for storing the image data temporarily. More specifically, the RAM and the storage media store raster data obtained by scanning graphic image. The RAM and the storage media store the vector data, information concerning the line widths and the color of the line graphics, and information concerning the color with in the enclosed area.

The communication interface corresponds to a network interface card (NIC). The NIC is also called a LAN board. The control unit 17 corresponds to a CPU.

The image-processing unit 7 is divided into several elements depending on their functions. More specifically, the image-processing unit 7 includes an area-identifying unit 19, a character recognition unit 21, a vector conversion unit 23, an enclosed area detection unit 27, a color detection unit 29, a copy image-processing unit 35, and a synthesizing unit 37.

The area-identifying unit 19 identifies character areas, graphic areas, and photograph areas of a document image scanned by the scanner engine 3 and divides the image data into those areas. The character recognition unit 21 recognizes character images contained in the character area and converts them into character code data. The vector conversion unit 23 extracts line graphics that include lines and/or curves contained in the graphic area, and generates vector data along the line graphics. The vector conversion unit 23 also contains a line width-detecting unit 25. The line width-detecting unit 25 detects information concerning the line width of the line graphics.

The enclosed area-extracting unit 27 extracts one or more enclosed areas surrounded by the extracted line graphics. The color-detecting unit 29 detects not only the information concerning the colors of the line graphics but also the information concerning the colors inside the enclosed areas surrounded by the extracted line graphics, so that the detected color information can be handled as one image data file with the vector data. Specifically, the color-detecting unit 29 consists of a vector color detecting unit 31 that detects the colors of the line graphics and an enclosed area color detection unit 33 that detects the colors within the enclosed areas.

The copy image-processing unit 35 executes the image-processing that consists of preprocessing that includes smoothing, and edge enhancement and binarizing processing that includes the error dispersion method (dither method). The copy image-processing unit 35 executes copy image-processing, which is image-processing for recreating the original image with high fidelity. The synthesizing unit 37 synthesizes the character data, the vector data added with the information concerning the line width and the color within the enclosed area, and photographic image in the photographic area. The synthesized image data is recorded in a specified file type (e.g., PDF) to generate an image data file.

Figure 2:
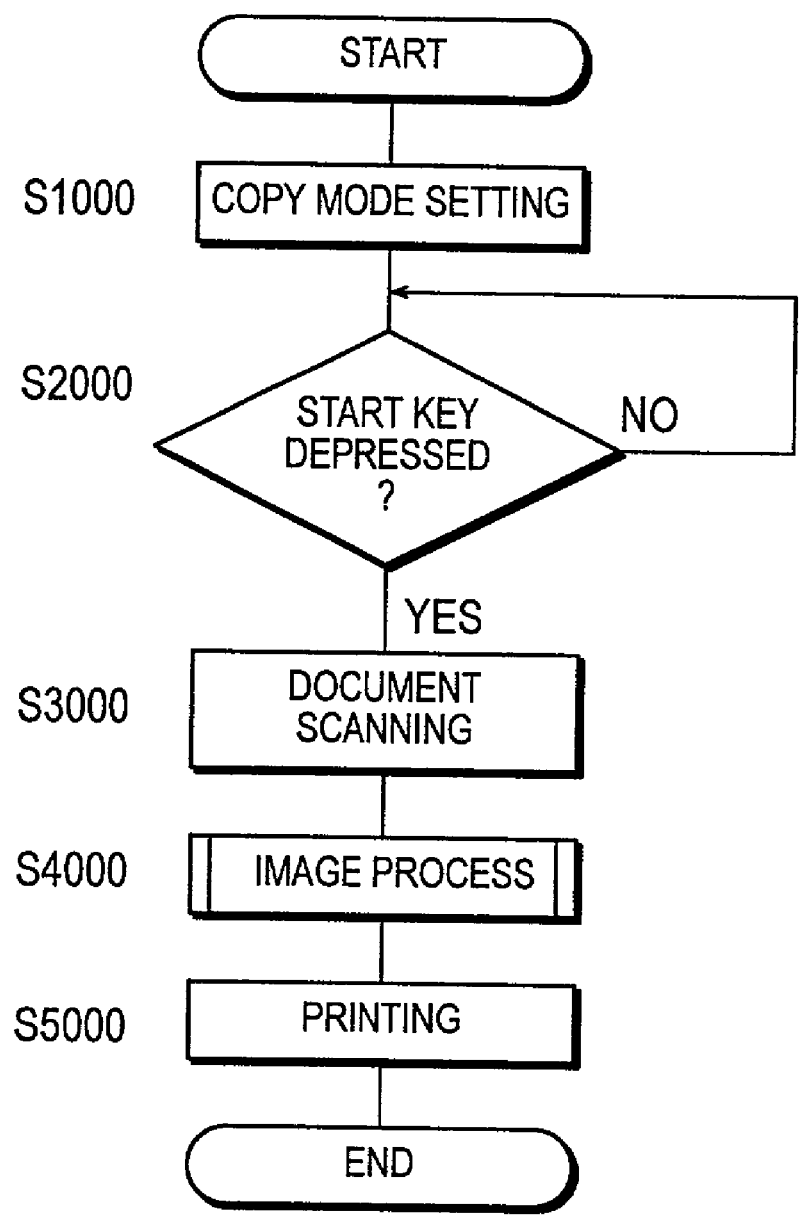
FIG. 2 is the main flowchart that shows the operation of the digital copying machine.

FIG. 2 is the main flowchart that shows the operation of the digital copying machine 100. The algorithm shown in the flowchart of FIG. 2 is stored as a control program in the memory 13 (ROM) of the digital copying machine 100 and is executed by the control unit 17 (CPU).

At the step S1000, the copy mode is set up. The copy mode is set up by means of the 10-key pad and setup menu screens displayed on the touch panel display on the operating panel 1. The copy mode includes, for example, the number of copies to be made, copying paper, copying scale, copy density, single/double sided copy, and non-sorting/sorting. The document to be made copy of is set up according to a specified method.

At the step S2000, it is judged whether the start key on the operating panel 1 is pressed. If the start key has not been pressed (S2000: No), the digital copying machine 100 waits until the start key is pressed. When the start key is pressed (S2000: Yes), the digital copying machine 100 judges that there was an instruction of the user, it advances to the step S3000, and starts the copying operation.

At the step S3000, the scanner engine 3 scans the document. As a result, digital image data is obtained. The obtained digital image data is raster data expressed in bitmap. When the ADF 5 is used, a document consisting of multiple sheets is transported automatically one sheet at a time to perform scanning continuously.

At the step S4000, the control unit 17 instructs the image-processing unit 7 to execute image-processing and the image-processing unit 7 executes the specified image process to the image data obtained at the step S3000. Consequently, an image data file for output is generated.

At the step S5000, the rasterizer 9 expands the image data file generated at the step S4000 into bitmap data. The printer engine 11 then prints the contents on paper based on the deployed data. If the document set on the machine is a color document, color printing is executed at this time.

Figure 3:
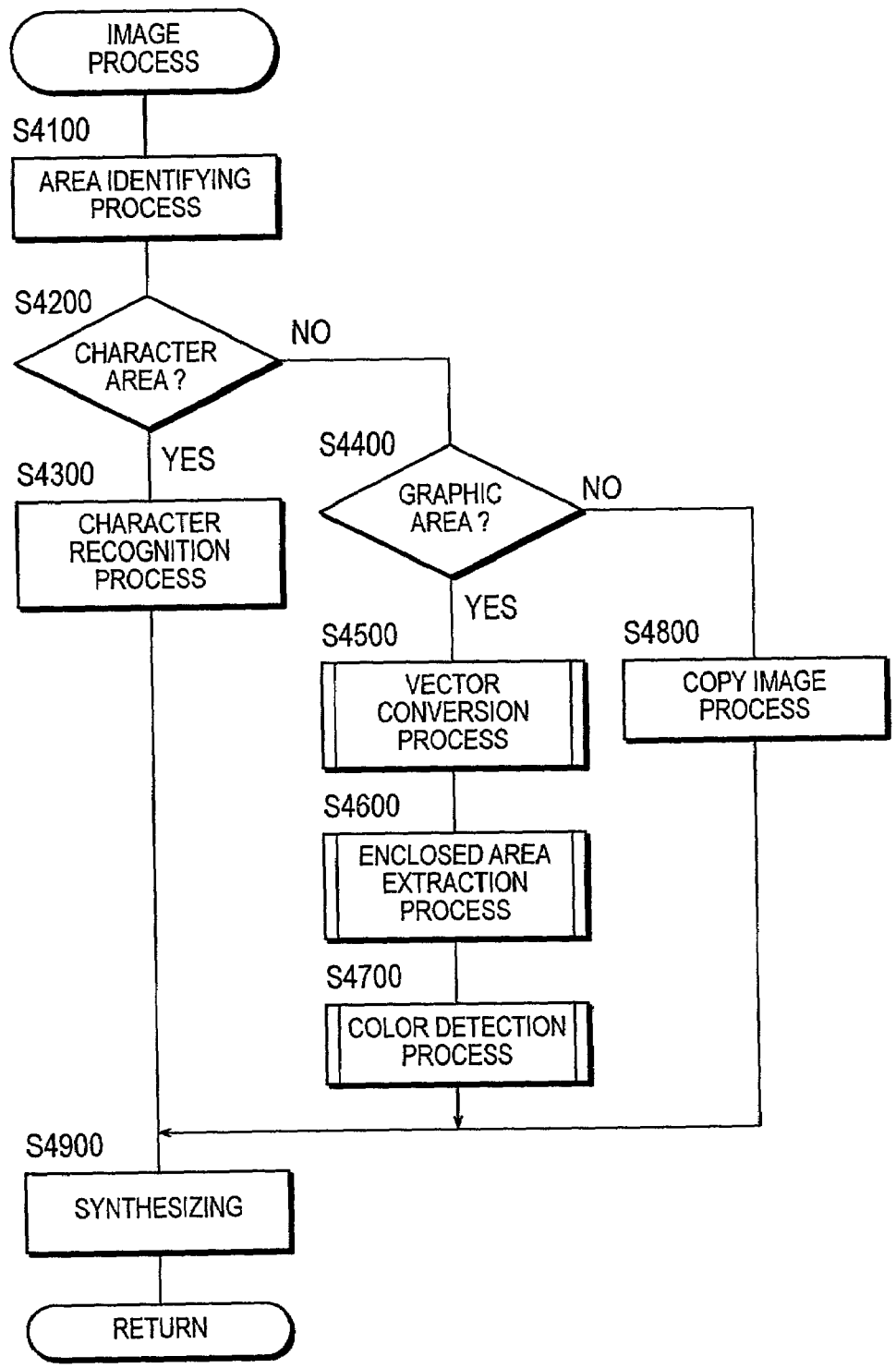
FIG. 3 is a flowchart that shows the contents of the image process of FIG. 2.

FIG. 3 is the flowchart that shows the contents of the image-processing shown at the step S4000 of FIG. 2.

At the step S4100, the area-identifying unit 19 executes area identification on the data obtained at the step S3000. Specifically, the area identification unit 19 classifies the document image obtained by the scanner engine 3 ("input image") into three areas, i.e., character area, graphic area and photographic area, and divides it accordingly. Different processes are applied to the data divided into the three kinds of areas respectively.

Character Area

At the step S4200, the area-identifying unit 19 makes a judgment whether the area-in-question is a character area. If it is a character area (S4200: Yes), it advances to the step S4300; if it is not a character area (S4200: No), it advances to the step S4400.

At the step S4300, the character recognition unit 21 recognizes the character image contained in the character area and converts it into character code data. Specifically, the character recognition area 21 converts the recognized character image into character codes such as the JIS code.

Graphic Area

At the step S4400, the area-identifying unit 19 makes a judgment whether the area-in-question is a graphic area. If it is a graphic area (S4400: Yes), it advances to the step S4500; if it is not a graphic area (S4400: No), more specifically if it is a photographic area, it advances to the step S4800.

At the step S4500, the vector conversion unit 23 executes the vector conversion process on the graphic area. The vector conversion unit 23 extracts line graphics contained in the graphic area, and generates vector data along the extracted line graphics. The line width detection unit 25 detects the information concerning the line width of the line graphics. The information concerning the line width is treated as a package with the vector data. The coordinates of the start point and the end point express the vector itself.

At the step S4600, the enclosed area-extracting unit 27 executes the enclosed area extraction process on the data converted into vectors. Thus, the enclosed areas that are surrounded by line graphics are extracted.

At the step S4700, the color detection unit 29 executes the color detection process. Thus, the color detection unit 29 detects the information concerning colors (color information) that is treated as a package with the vector data that are obtained by conversion at the step S4500. The color information contains colors of the enclosed areas surrounded by the line graphics in addition to the colors of the line graphics. The color of a line graphic (i.e., color corresponding to a vector) is detected by the vector color detection unit 31. The enclosed area color detection unit 33 detects the color of the enclosed area.

A series of processes mentioned above concerning the graphic area, i.e., the vector conversion at the step S4500, the enclosed area extraction process at the step S4600, and the color detection process at the step S4700, are the processes for realizing advanced vector conversion according to the invention, and these three are jointly named here as the "advanced vector conversion process." The data obtained as a result of the advanced vector conversion process contains information on the line widths and colors of line graphics and the color within the enclosed areas surrounded by the line graphics in addition to the vector data.

Photographic Area

At the step S4800, the copy image-processing unit 35 executes the image-processing that includes the aforementioned preprocess and binarizing processing on the picture areas to recreate the original image with high fidelity.

When the processing on all areas is completed, the synthesizing unit 37 synthesizes the character data, vector data (containing both line width and color information) and picture area, which are the results of the processing on each area at the step S4900, and generates the image data file by recording the synthesized image data in a specified file format (PDF, etc.). This image data file is stored in the memory 13.

<Vector Conversion and Detection of Line Width of Line Graphic>

Figure 4:
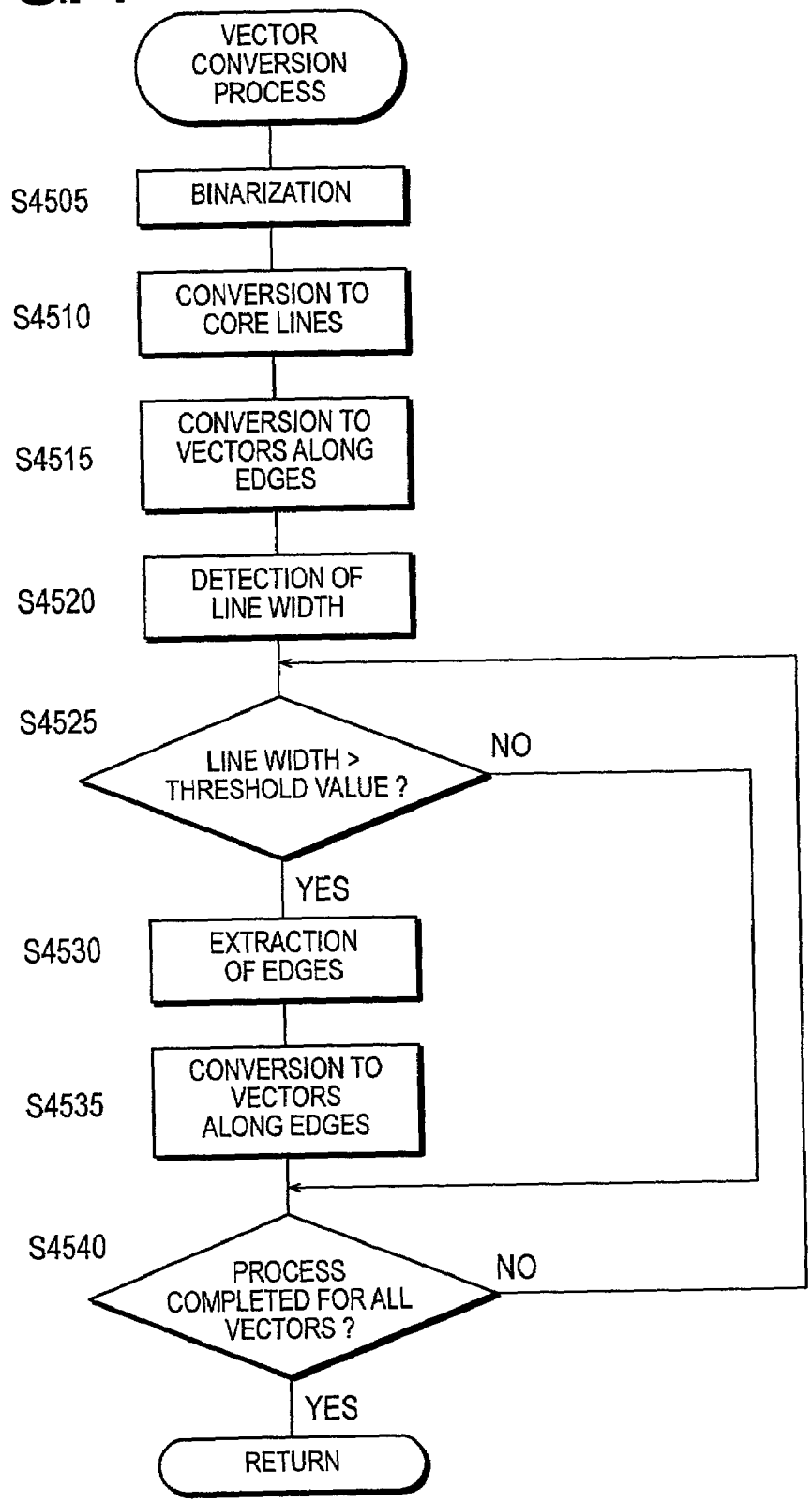
FIG. 4 is a flowchart that shows the contents of the vector conversion process of FIG. 3.

FIG. 4 is the flowchart that shows the contents of the vector conversion process at the step S4500 of FIG. 3. At the step S4505, the binarization process is executed on the image data of the graphic areas in any conventional method to obtain a binary image.

At the step S4510, the vector conversion unit 23 executes the center lining process on the binary image obtained at the step S4505 in any conventional method to extract the core line with the line width of 1.

At the step S4515, the vector conversion unit 23 executes the vector conversion using the core line data obtained at the step S4510. In other words, the vector conversion unit 23 converts the core line into vectors. Thus, the vector data along an extracted line graphic may be generated by means of converting the line graphic into a core line. The vector generated by converting a line graphic into a core line is called a core line vector. The core line here is expressed as an assembly of line segment vectors. If a straight line portion is long, the generated vector is a long vector, while a curved portion is expressed as a series of short vectors.

The method used here to express a line graphic is a method of extracting the core line and converting it to vectors, but the method of converting it to vectors are not limited to it, but rather any appropriate method can be used.

At the step S4520, the line width detection unit 25 detects the line width of a line graphic converted into vectors at the step S4515. The detection of the line width is done by statistically processing the data obtained in the conversion process into the core line or vectors. More specifically, the line width can be detected by obtaining the average distance between the edges of the line that constitute the line graphic and the core line and doubling the average distance. The detected information concerning the line width is handled as a package with the vector data of the corresponding line graphic. Any appropriate method can be used for the detection of the line width.

Thus, to be able to handle the information concerning the line width of the line graphic as a package with the vector data is one of the features of the invention.

At the step S4525, the line width detection unit 25 selects one vector from all the core line vectors obtained at the step S4515 and compares the line width detected at the step S4520 that is attached to the selected vector with a prescribed threshold value. The process of judging whether the line width of the line graphic is larger is used for making a judgment on whether to use the line graphic as a line or an area. If the line width is larger than the threshold value (S4525: Yes), the particular portion of the line graphic is judged to be treated as an area rather than a line, and the control advances to the process of the step S4530. If the line width is less than the threshold value (S4525: No), the portion of the line graphic is judged to be treated as a line, and the control advances to the step S4540.

At the step S4530, the edges of the line where the line width is larger than the specified threshold are detected.

At the step S4535, the vector conversion unit 23 executes the vector conversion using the edge data detected at the step S4530. In other words, the vector conversion unit 23 converts all the edges detected into vectors ("edge vector"). These edge vectors are attached with information stating that the line width is 1.

At the step S4540, a judgment is made whether the comparison at the step S4525 to all the core line vectors obtained at the step S4515 is completed. If the comparison process of the step S4525 is not completed for all the core line vectors (S4540: No), the control returns to the step S4525 to start the comparison process for the next core line vector. If the comparison process to the entire core line vectors is completed (S4540: Yes), the control returns to the flowchart shown in FIG. 3.

<Extraction of the Enclosed Area>

Figure 5A:
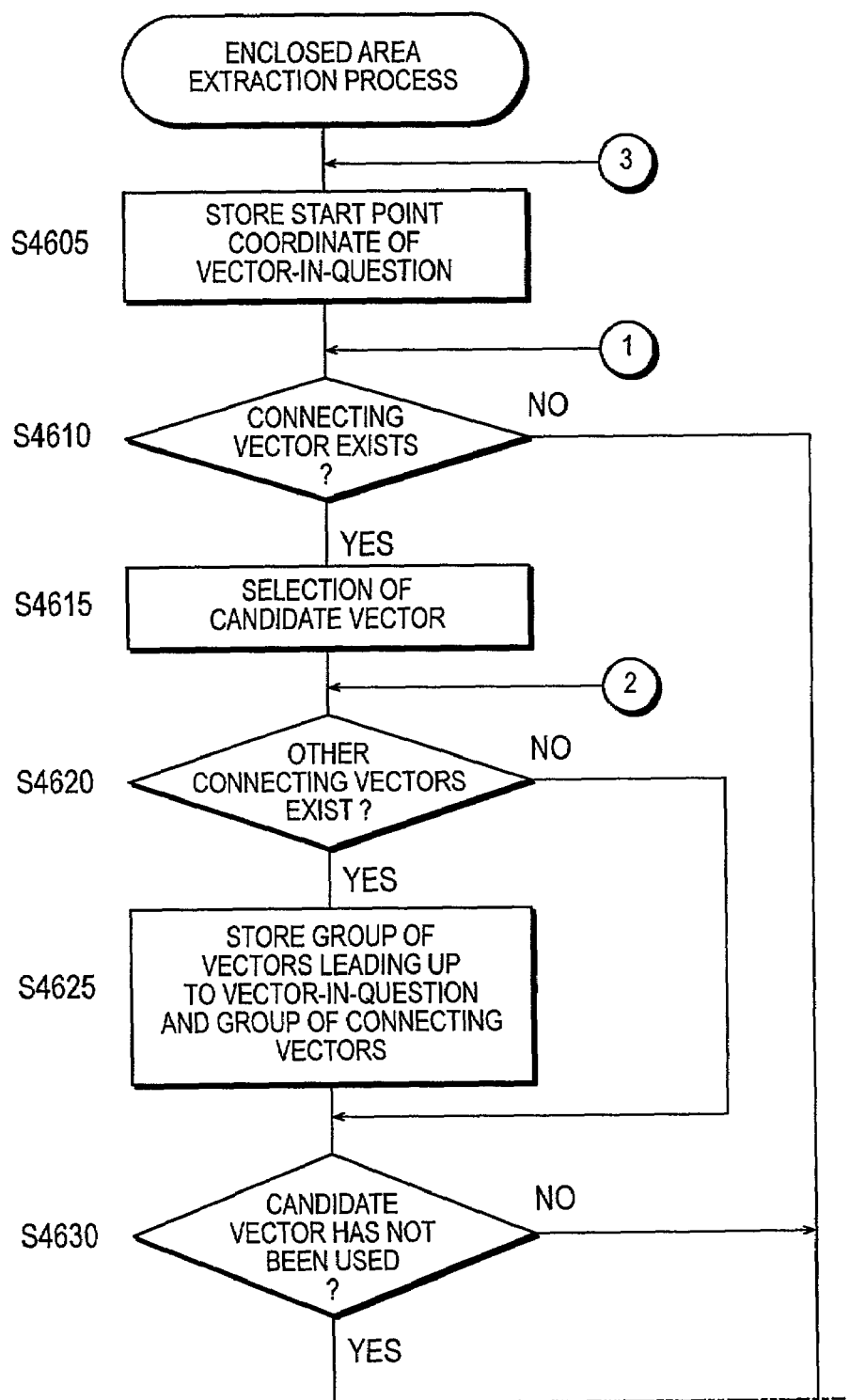
FIGS. 5A and 5B are flowcharts that show the contents of the enclosed area extraction process of FIG. 3.
Figure 5B:
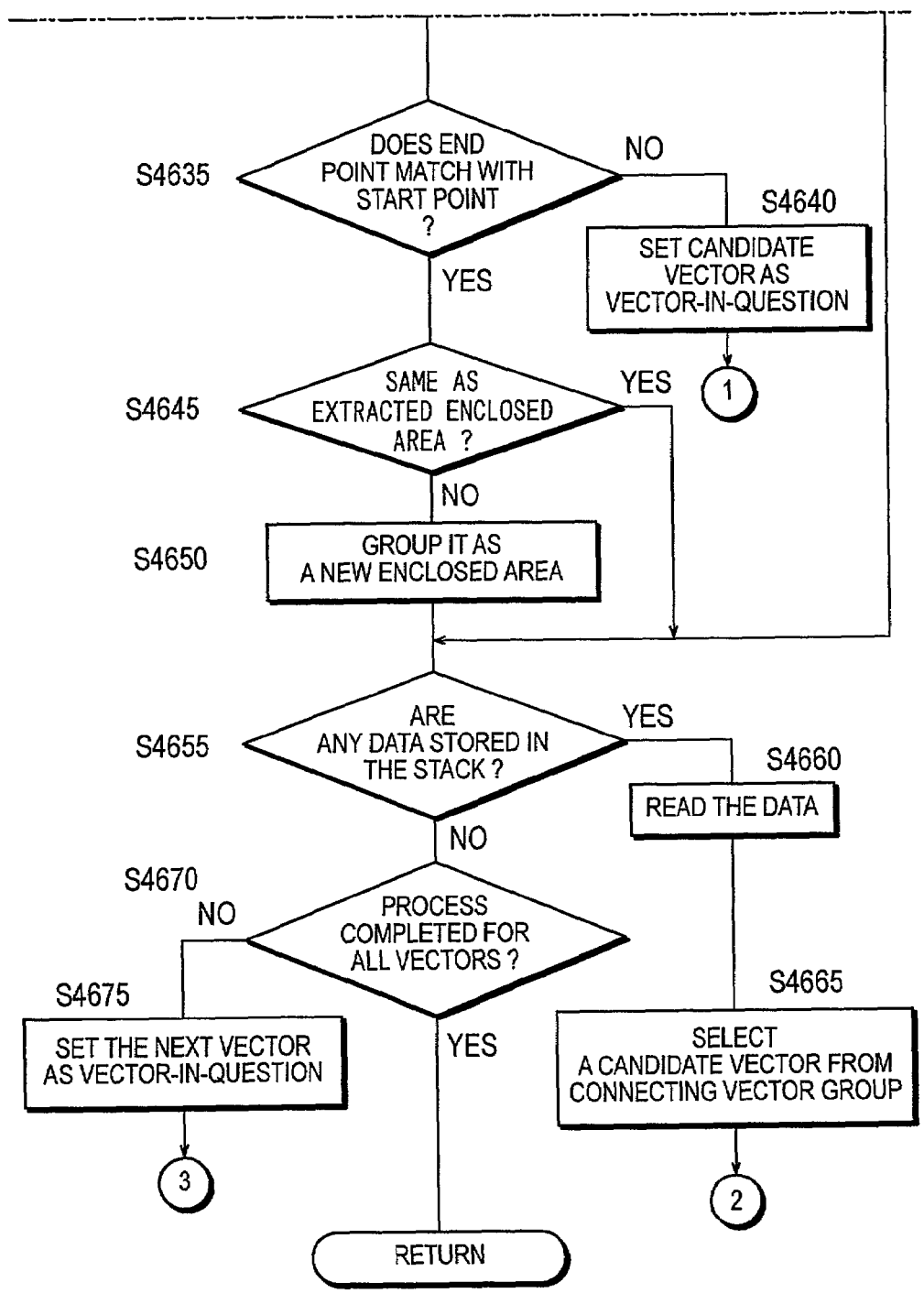

FIG. 5A and 5B are flowcharts showing the contents of the enclosed area extraction process at the step S4600 of FIG. 3.

At the step S4605, the enclosed area extraction unit 27 stores the coordinate of the vector-in-question in the memory 13 (RAM). At the start of this enclosed area extraction process, one vector is selected from the vector data (group of vectors) obtained at the step S4500, and is used as the vector-in-question. The vector-in-question in the initial stage where the start point coordinate is stored is called "initial vector-in-question" and is differentiated from the other vectors-in-question that do not accompany the storage of the start point coordinate.

At the step S4610, the enclosed area extraction unit 27 makes a judgment whether there is another vector that connects with the end point of the vector-in-question. The judgment is made by searching vectors that have the same starting coordinates or end coordinates as that of the end point coordinate of the vector-in-question. If there is any vector that connects with the end point of the vector-in-question (S4610: Yes), the control advances to the step S4615. If there is no vector that connects with the end point of the vector-in-question (S4610: No), the control advances to the step S4655.

At the step S4615, one vector is selected from all other vectors searched at the step S4610 and this vector is used as the candidate vector.

At the step S4620, a judgment is made whether there is any other vector that connects with the end point of the vector-in-question other than the candidate vector. If there is a connecting vector other than the candidate vector (S4620: Yes), the control advances to the step S4625. If there is no connecting vector other than the candidate vector (S4620: No), the control advances to the step S4630.

At the step S4625, the enclosed area-extracting unit 27 stores a group of vectors that show the route from the initial vector-in-question to the current vector-in-question and a group of connecting vectors other than the candidate vector in a stack provided in the memory 13 (RAM). This is to prevent the enclosed area from being extracted due to vector branching.

At the step S4630, the enclosed area extracting unit 27 makes a judgment whether the candidate vector has ever been used. If the candidate vector has never been used so far (S4630: Yes), the control advances to the step S4635. If the candidate has been used before (S4630: No), the control advances immediately to the step S4655.

At the step S4635, the enclosed area extract unit 27 makes a judgment whether the coordinate of the end point of the candidate vector matches with the starting coordinate stored at the step S4605. If the end point coordinate of the candidate vector does not match with the stored starting coordinate (S4635: No), the control advances to the step S4640. If the end point coordinate of the candidate vector matches with the stored starting coordinate (S4635: Yes), the control advances to the step S4645 judging that the enclosed area is detected.

At the step S4640, the enclosed area extracting unit 27 repeats the above processes by returning to the step S4610 and using the candidate vector as the vector-in-question.

At the step S4645, the enclosed area extracting unit 27 judges whether the enclosed area detected at the step S4635 is the same as the enclosed area, which has been detected and already grouped. This judgment is done by comparing the groups of the vectors that constitute the enclosed areas. If the detected enclosed area is the same as the enclosed area, which has already been grouped (S4645: Yes), the control advances to the step S4655. If the detected enclosed area is not the same as the enclosed area, which has already been grouped (S4645: No), the control advances to the step S4650.

At the step S4650, the enclosed area-extracting unit 27 groups the detected vectors as the group for the newly extracted enclosed area.

At the step S4655, the enclosed area-extracting unit 27 makes a judgment whether there is any data stored in the stack. The process of the step S4655 is executed, as mentioned above, when no other vector that connects with the end point of the vector-in-question (S4610: No), when the candidate vector has ever been used (S4630: No), and when the same enclosed area as the enclosed area, which has already been grouped, is detected (S4645: Yes). If some data are stored at the stack (S4655: Yes), the control advances to the step S4660. If no data is stored at the stack (S4655: No), the control advances to the step S4670, judging that the entire data stored at the stack has been searched.

At the step S4660, the data are read out from the stack. At the step S4665, one vector is selected to be the candidate vector from the group of connecting vectors read out from the stack and the control returns to the step S4620. This makes it possible to extract all enclosed areas without fail eliminating the chance of missing any areas due to branching even if one line is branching into several lines.

At the step S4670, a judgment is made whether the extraction of enclosed areas is completed for the entire vectors of the group of vectors obtained at the step S4500. If the extraction has not been completed for the entire vectors (S4670: No), the process at the step S4675 is executed. If the extraction has been completed for the entire vectors (S4670: Yes), the enclosed area extraction process terminates and the control returns the flowchart of FIG. 3.

At the step S4675, the next vector from the group of vectors obtained at the step S4500 is selected to be the initial vector-in-question. The control then returns to the step S4605, and the above process is repeated.

Figures 9, 10:
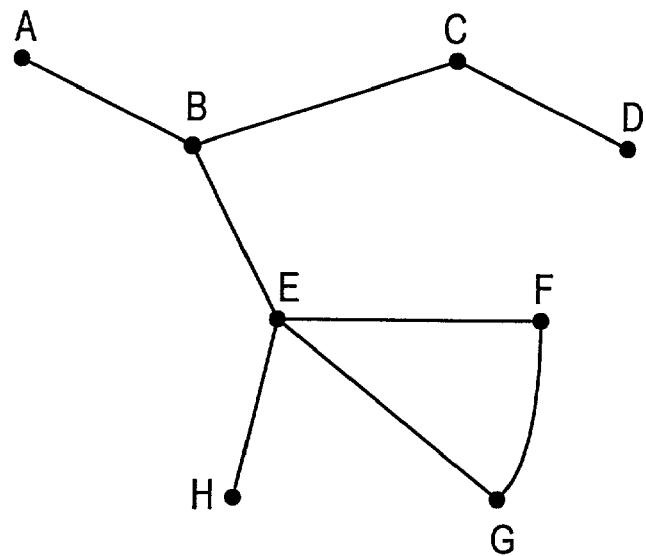
FIG. 9 is a diagram that shows an example of data converted into vectors (vector group).
FIG. 10 is a diagram that shows the data stored in a stack.

Next, the content of the enclosed area extracting process is described in further detail referring to FIG. 9 through FIG. 14. FIG. 9 is a diagram that shows an example of data converted into vectors and FIG. 10 through FIG. 14 are diagrams that show the data stored in stacks.

A vector AB is selected as the initial vector-in-question. The start point A of this initial vector-in-question AB is stored in the memory 13 (RAM) (S4605). A search is made for other vectors that connect with the end point B of the vector AB. Since there are two other vectors that connect with the end point B of the vector-in-question AB (S4610: Yes), one of them, i.e., vector BC, is selected as the candidate vector (S4615). Since another connecting vector (vector BE) exists, in addition to the candidate vector BC (S4620: Yes), the vector group leading up to and including the vector-in-question (vector AB) and the connecting vector group (vector BE) other than the candidate vector are stored in a stack (refer to FIG. 10) (S4625). Since the candidate vector BC has never been used (S4630: Yes) and the end point C of the candidate vector BC does not match with the start point A (S4635: No), the candidate vector BC becomes the vector-in-question (S4640).

A search is made for other vector that connects with the end point C of the vector-in-question BC. Since another vector that connects with the end point C of the vector-in-question BC exists (S4610: Yes), the vector CD is selected as the candidate vector (S4615). Since no other connecting vector other than this candidate vector CD exists (S4620: No), no data is stored into the stack. The candidate vector CD has never been used (S4630: Yes) and the end point D of the candidate vector CD does not match with the start point A (S4635: No), the candidate vector CD becomes the vector-in-question (S4640).

A search is made for other vectors that connect with the end point D of the vector-in-question CD. There is no other vector that connects with the end point D of the vector-in-question CD in this case (S4610: No). Therefore, a search is conducted for data that correspond to other branches. Since there is data stored in the stack (refer to FIG. 10) (S4655: Yes), the data is read from the stack (S4660). The vector BE read out of the stack is selected as the candidate vector (S4665). At this point, the stack becomes empty temporarily.

Since there is no other vector, other than the candidate vector BE that connects with the vector AB (S4620), no data will be stored into the stack. Since the candidate vector BE has never been used (S4630: Yes) and the end point E of the candidate vector BE does not match with the stored start point A (S4635: No), the candidate vector BE becomes a vector-in-question (S4340).

A search is made for other vectors that connect with the end point E of the vector-in-question BE. In this case, since there are three other vectors that connect with the end point E of the vector-in-question BE (S4610: Yes), one of the vectors, i.e., vector EF, is selected as the candidate vector (S4615). Since there are other connecting vectors (vector EG and vector EH) in addition to the candidate vector EF (S4620: Yes), the group of vectors (vector AB and vector BE) leading up to and including the vector-in-question and the group of other connecting vectors (vector EG and vector EH), other than the candidate vector, will be stored in the stack (refer to FIG. 11) (S4625). Since the candidate vector EF has never been used (S4630: Yes) and the end point F of the candidate vector EF does not match with the stored start point A (S4635: No), the candidate vector EF becomes the vector-in-question (S4640).

A search is made for other vectors that connect with the end point F of the vector-in-question EF. Since another vector exists that connects with the end point F of the vector-in-question EF (S6105: Yes), the vector FG is selected as the candidate vector (S4615). Since no other connecting vector other than this candidate vector FG exists (S4620: No), no data is stored into the stack. The candidate vector FG has never been used (S4630: Yes) and the end point G of the candidate vector FG does not match with the start point A (S4635: No), the candidate vector FG becomes the vector-in-question (S4640).

A search is made for other vectors that connect with the end point F of the vector-in-question FG, and since another vector exists that connects with the end point G of the vector-in-question FG (S4610:Yes), this vector GE is selected as the candidate vector (S4615). Since no other connecting vector other than this candidate vector GE exists (S4620: No), no data is stored into the stack. The candidate vector GE has never been used (S4630: Yes) and the end point E of the candidate vector GE does not match with the start point A (S4635: No), the candidate vector GE becomes the vector-in-question (S4640).

A search is made for other vectors that connect with the end point E of the vector-in-question GE. In this case, since there are three other vectors that connect with the end point E of the vector-in-question GE (S4610: Yes), one of the vectors, i.e., vector EB, is selected as the candidate vector (S4615). Since there are other connecting vectors (vector EF and vector FH) in addition to the candidate vector EB (S4620: Yes), the group of vectors (vector AB, vector BE, vector EF, vector FG, and vector GE) leading up to and including the vector-in-question and the group of connecting vectors (vector EF and vector EH) other than the candidate vector will be stored in the stack (refer to FIG. 12) (S4625). However, the candidate vector EB has been used in the previous route (S4630: No). Therefore, the candidate vector EB does not become a vector-in-question. Thus, a search is made for other data that correspond to other branches. More specifically, since there are data stored in the stack (refer to FIG. 12) (S4655: Yes), the data are read out from the stack (S4660). The vector EF read out from the stack is selected as the candidate vector (S4665). The data stored in the stack at this point is as shown in FIG. 11.

Since there is another connecting vector (vector EH) exists other than the candidate vector EF (S4620: Yes), the group of vectors (vector AB, vector BE, vector EF, vector FG, and vector GE) leading up to and including the vector-in-question and the group of connecting vectors (vector EH) other than the candidate vector will be stored in the stack (refer to FIG. 13) (S4625). However, since the candidate vector EF has also been used in the previous route (S4630: No), it does not become a vector-in-question. Therefore, a search is made for data concerning other branches. Since there are some data stored in the stack (refer to FIG. 13) (S4655: Yes), the data are read from the stack (S4660). One of the connecting vectors, i.e., vector EH, is selected as the candidate vector (S4665). The data stored in the stack at this point again becomes as shown in FIG. 11.

Since no other connecting vector other than this candidate vector EH exists (S4620: No), no data is stored into the stack. The candidate vector EH has never been used (S4630: Yes) and the end point H of the candidate vector EH does not match with the start point A (S4635: No), the candidate vector EH becomes the vector-in-question (S4640).

A search is made for other vectors that connect with the end point H of the vector-in-question EH. There is no other vector that connects with the end point H of the vector-in-question EH in this case (S4610: No). Therefore, a search is conducted for data that correspond to other branches. Since there are some data stored in the stack (refer to FIG. 11) (S4655: Yes), the data are read from the stack (S4660). The vector EG from the connecting vector group is selected as the candidate vector (S4665). At this point, the stack becomes empty again.

Since there is another connecting vector (vector EH) exists other than the candidate vector EG (S4620: Yes), the group of vectors (vector AB, vector BE) leading up to and including the vector-in-question and the group of connecting vectors (vector EH) other than the candidate vector will be stored in the stack (refer to FIG. 14) (S4625). However, since the candidate vector EG has already been used in the previous route (S4630: No) and there are some data stored in the stack (refer to FIG. 14) (S4655: Yes), it does not become a vector-in-question. Therefore, a search is made for data concerning other branches. More specifically, the data are read from the stack (S4665). The vector EH is selected from the connecting vector group as the candidate vector (S4665). At this point, the stack becomes empty.

Since no other connecting vector other than this candidate vector EH exists (S4620: No), no data is stored into the stack. However, since the candidate vector EH has already been used in the previous route (S4630: No), it does not become a vector-in-question. Since there is not data stored in the stack (S4655: No), no branching does not exist. Therefore, the extraction for enclosed areas in case of using the vector AB as the initial vector-in-question terminates. However, since the extraction for the entire vectors has not bee terminated (S4670: No), one of the vectors other than vector EB for the vector group shown in FIG. 9 (e.g., vector BC) is selected as the initial vector-in-question (S4675) to repeat the execution of a similar processing.

The extraction of enclosed areas is repeated in sequence by selecting each of the remaining vectors as the initial vector-in-question. As a consequence, the enclosed area EFG is detected for the cases where the initial vector-in-questions are the vectors EF, FG, and EG. However, it is grouped as the enclosed area EFG surrounded by line graphics (S4650) only when it is detected for the first time (S4645: No). The enclosed area surrounded by line graphics is thus extracted with the above procedures.

<Detection of the Color >

Next, the procedures for detecting colors of line graphics and colors of enclosed areas surrounded by line graphics are shown.

Figure 6:
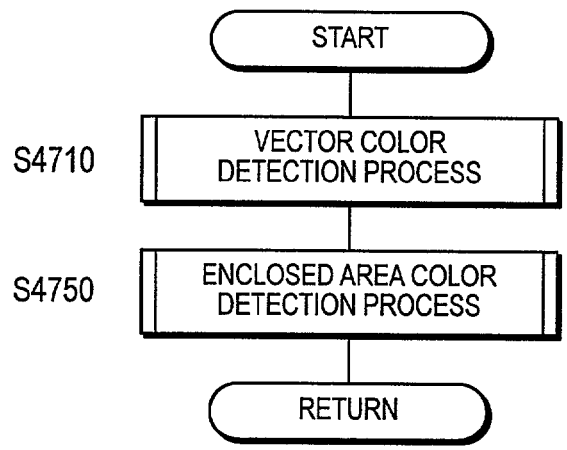
FIG. 6 is a flowchart that shows the contents of the color detection process of FIG. 3.

FIG. 6 is a flowchart showing the contents of color detection procedures shown at the step S4700 of FIG. 3.

At the step S4710, the vector color detection unit 31 detects the color of the line graphics obtained at the step S4500. At the step S4750, the enclosed area color detection unit 33 detects the color in the enclosed area extracted at the step 4600, i.e., the color in the enclosed area surrounded by the line graphics converted into vectors. To be able to detect the information concerning the color of an enclosed area surrounded by line graphics is one of the features of the invention.

Figure 7:
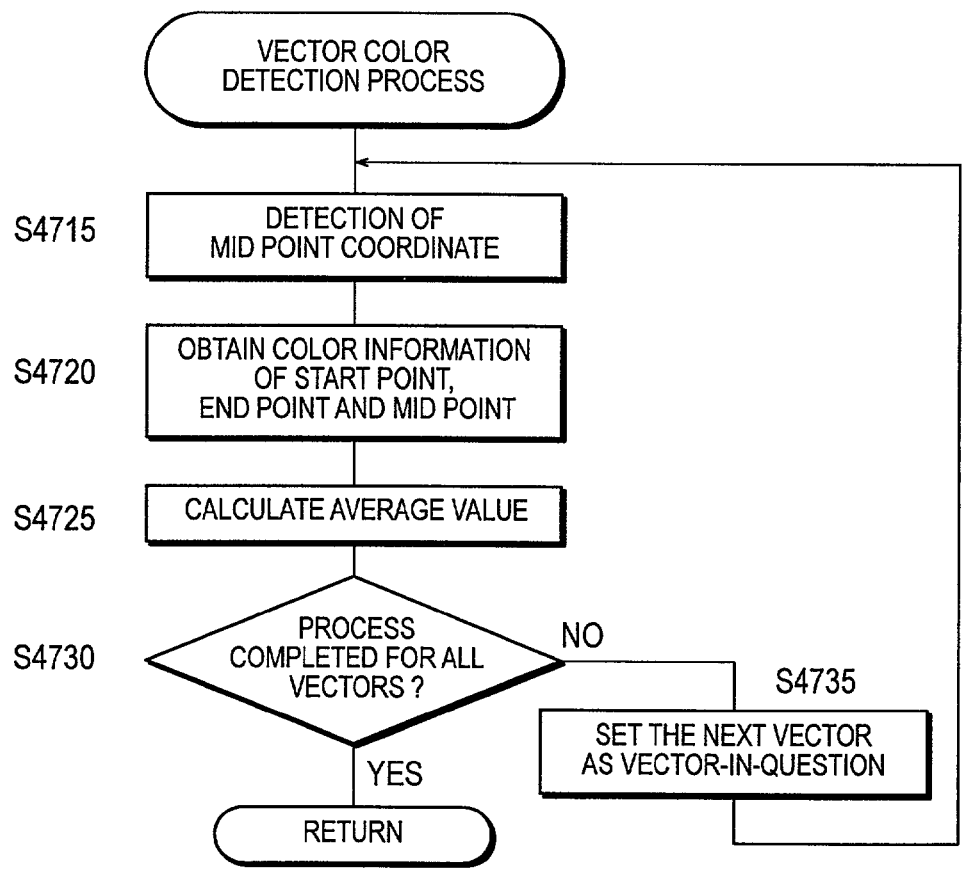
FIG. 7 is a flowchart that shows the contents of the vector color detection process of FIG. 6.

FIG. 7 is a flowchart showing the contents of the vector color detection process of FIG. 6.

In executing the vector color detection process, the entire vector data obtained at the step S4500 is read from the memory 13 (RAM). The vector data consists of coordinate data of the start point and the end point, and also includes the line width information at this point.

At the step S4715, the vector color-detecting unit 31 calculates the coordinate of the mid point of a vector from its start point and end point coordinates. More specifically, the vector color detection unit 31 calculates the coordinate of a point that divides the distance between the start point and the end point to 1:1.

At the step S4720, the vector color detection unit 31 obtains the color information of the positions corresponding to the three points, i.e., the start point, the mid point, and the end point. The color information can be expressed in various kinds of data, such as RGB, CMYK or L*a*b*.

At the step S4725, the average value of the color information of the start point, the mid point, and the end point. The average value thus obtained is outputted as the information concerning the particular line graphic.

At the step S4730, a judgment is made whether the color detection of all vectors is completed. If the color detection of all vectors is not yet completed (S4730: No), the control advances to the step S4735. If the color detection of all vectors has been completed (S4730: Yes), the vector color detection process is terminated and the control returns to the flowchart of FIG. 6.

Figure 8:
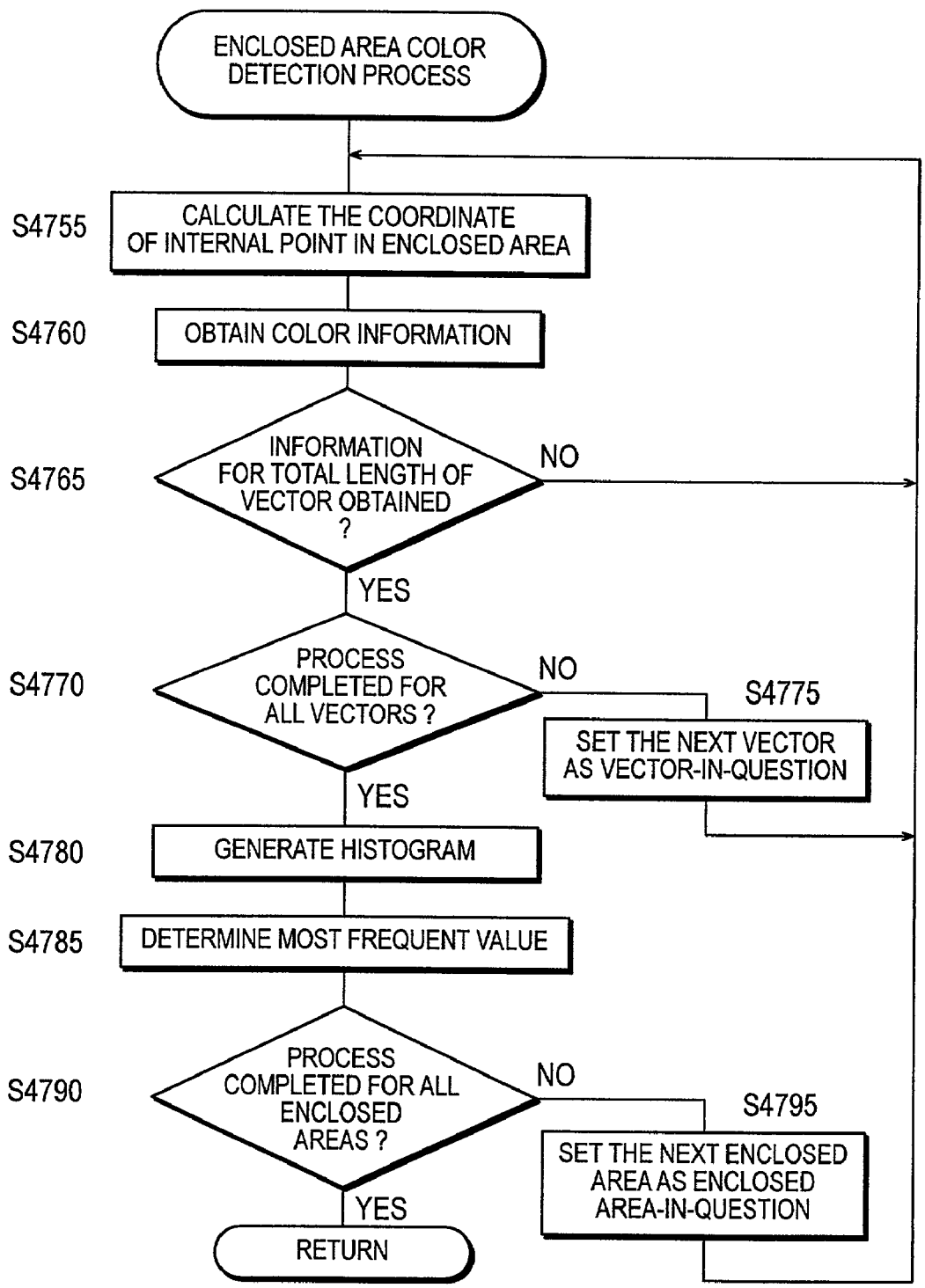
FIG. 8 is a flowchart that shows the contents of the enclosed area color process of FIG. 6.

At the step S4735, the next vector is selected as the vector-in-question, and the control returns to the step S4715 to execute a similar process as the above. FIG. 8 is a flowchart showing the contents of the enclosed area color detection process of FIG. 6. In executing the enclosed area color detection process, all the vector data groups grouped as enclosed areas obtained at the step S4600 are read from the memory 13 (RAM).

At the step S4755, the enclosed color detection unit 31 calculates the coordinate of an internal point reached by advancing a certain distance, e.g., {(line width/2)+.} dots, perpendicular to the vector from a point on the vector toward the inside of the enclosed area. In the above formula, is a positive integer. The calculation formula of the coordinate of the internal point is not limited to {(line width/2)+.}, rather it can be any formula suitable for calculating the coordinate of the internal point of the enclosed area that does not contain the line width.

At the step S4760, the enclosed area color detection unit 31 obtains the color information of the position corresponding to the coordinated of the internal point obtained at the step S4755. The color information concerning the closed area can be expressed in various kinds of data, such as RGB, CMYK or L*a*b*.

At the step S4765, a judgment is made whether the detection of the color information has been completed for the total length of the current vector-in-question, specifically, for the specified number of sampling points for the vector-in-question. If the detection of the color information has been completed for the total length of the vector-in-question (S4765: Yes), the control advances to the step S4770. If the detection of the color information has not been completed for the total length of the vector-in-question (S4765: No), the control returns to the step S4755.

At the step S4770, a judgment is made as to whether the color information has been detected for all vectors of the vector group that constitute the enclosed area in question. If the detection of the color information for the entire length of each vector for all vectors that constitute the enclosed area has not been completed (S4770: No), the control advances to the step S4775. If the detection of the color information for the entire length of each vector for all vectors that constitute the enclosed area has been completed (S4770: Yes), the control advances to the step S4780.

At the step S4775, the next vector in the vector group that constitutes the current enclosed area is selected as the vector-in-question, and the control returns to the step S4755.

At the step S4780, the enclosed area color detection unit 31 generates a histogram concerning the color information detected for the entire length of each vector for all the vectors that constitute the enclosed area.

At the step S4785, the enclosed area color detection unit 31 detects the color information value of the highest frequency from the histogram generated at the step S4780 ("most frequent value") and defines this highest frequency value as the color of the enclosed area. The reason for using the most frequent value as the color of the enclosed area is to prevent the occurrence of a case where it fails to detect the proper color inside the enclosed area. For example, if there is a cross point, where multiple vectors (line segments) cross each other, there is a possibility of detecting the color of a crossing line itself. The use of the most frequent value provides a means of detecting the color of the enclosed area itself without fail even when multiple vectors are crossing each other.

At the step S4790, a judgment is made whether the color detection is completed for all enclosed areas that are extracted. If the color detection has not been completed for all the enclosed areas (S4790: No), the control advances to the step S4795. If the color detection has been completed for all the enclosed areas (S4790: Yes), the control returns o the flowchart of FIG. 6.

At the step S4795, the next enclosed area is selected from the extracted multiple enclosed area as the enclosed area-in-question, and the control returns to the step S4755.

Although it is described in the above to use the average value or the most frequent value in the detection of the colors of the line graphics and the colors inside the enclosed areas surrounded by the line graphics, the invention is not limited to it. For example, medians or other statistical values can also be used for the color detections. Also, it goes without saying that the more samples are used, the more accurate the results will be.

Figure 15:
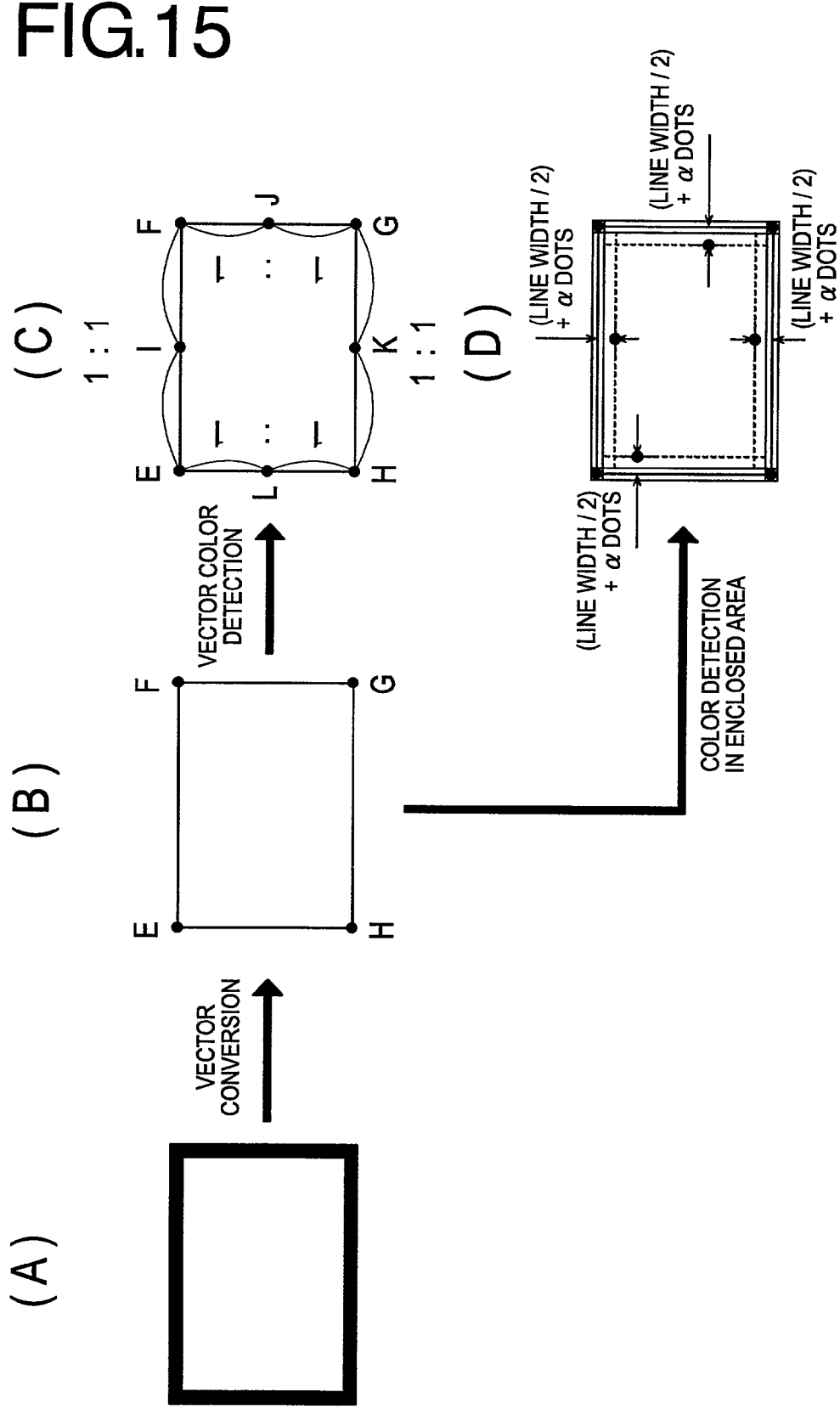
FIG. 15 is a diagram for describing the advanced vector conversion process for an enclosed area with a frame line.

A specific example of the above procedure for graphic areas will be described in the following referring to FIG. 15. It is assumed that an example graphic image is an enclosed area, which has a black frame line and its inside is covered with green, as shown in FIG. 15(A). Let us also assume that the line width of the frame line is smaller than the threshold value.

When the image data of the enclosed area with a frame line as shown in FIG. 15(A) is inputted into the vector conversion unit 23, the processes of binarization (S4505), core line conversion (4510), vector conversion (S4515), and line width detection (S4520) are conducted in the sequence at the step S4500 of FIG. 3 (refer to FIG. 4 for detail). Since the line width is smaller than the threshold value (S4525: No), the core line vectors will be outputted. More specifically, four core line vectors, i.e., vector EF, vector FG, vector GH, and vector HE, are generated along the line graphics EFGH as shown in FIG. 15B. Each of the vector data has the information of the start point coordinate, the end point coordinate, and the line width.

When the data for these four vectors are entered into the enclosed area extraction unit 27, the vector EF, for example, is set up as the vector-in-question at the step S4600. The coordinate of the start point E of the vector EF is stored at the memory 13 (RAM) (S4605). Since there is one other vector that connects with the end point F (S4610: Yes) in this case, the vector FG becomes the candidate vector (S4615). Since this vector FG has never been used (S4630: Yes) and the coordinate of the end point G of the vector FG does not match with the stored coordinate of the start point E (S4635: No), the vector FG is selected as the vector-in-question (S4640).

Repeating a similar process on the vector-in-question FG, the vector GF becomes the vector-in-question. Further continuing on the process, the vector HE becomes the vector-in-question. When the vector-in-question is the vector HE, the coordinate of the end point E of the vector HE matches with the stored coordinate of the start point E (S4635: Yes), so that a judgment is made whether the vector group (vector EF, vector FG, vector GH, and vector HE) has already been grouped as an enclosed area (S4645). Since it has not been grouped yet in this case (S4645: No), the vector group (vector EF, vector FG, vector GH, and Vector HE) is grouped as a newly extracted enclosed area (S4650).

The vector color detection unit 31 and the enclosed color detection unit 33 detect the color of the line graphics (vector) themselves and the color of the inside of the enclosed area respectively according to the step S4700 of FIG. 3 (refer to FIGS. 6 and 7 for detail).

In the vector color detection process, the line graphics that correspond to the data of the four vectors are inputted into the vector color detection unit 31. In this case, the coordinate of, for example, the mid point I of the vector EF is calculated at the step S4710 of FIG. 6 (refer to FIG. 7 for details) in this case (S4715). The color information of the positions corresponding to the start point, end point, and mid point are obtained from the input image data (S4720), the average value of these data is calculated, and this average value is detected as the color information of the vector EF (S4725). This process is repeated for the remaining vectors, i.e., vector FG (mid point J), vector GH (mid point K), and vector HE (mid point L) in sequence. As a result of this, it is possible to add the color information to each vector and the colors of all line graphics are detected (refer to FIG. 15(C)).

In the enclosed area color detection process, when the enclosed color detection unit 33 receives the group of vectors that are recognized as an enclosed area surrounded by line graphics, the coordinate is calculated for an internal point reached by advancing perpendicular to the vector from a point on the vector in the aforementioned manner for each vector (line segment) at the step S4750 of FIG. 6 (refer to FIG. 8) (S4755). The color information is obtained for the positions corresponding to the internal points from the input image data (S4720). A histogram is generated for the color information for the total length of the vector for each vector (S4780). The most frequent value is detected as the color information of the enclosed area (S4785). This makes it possible to handle the color information within the enclosed area as a package (refer to FIG. 15(D)).

Therefore, according to this embodiment, it is possible to handle and store the information concerning the line width and color of the line graphics and the information of the color inside the enclosed area together with the vector data as a package (as one image data file). More specifically, not only the color of a diagram, but also the color inside an enclosed area can be detected and handled with the vector data as a package (as one image data file), so that it can reproduce faithfully not only the line color but also the color inside an enclosed area. Moreover, since the information of the line widths of line graphics can be handled with vector data as a package, it provides the benefits of reduced data volume and improved convenience in data handling as well as prevention of line width change in scaling the graphics up and down during the editing process.

Figure 16:
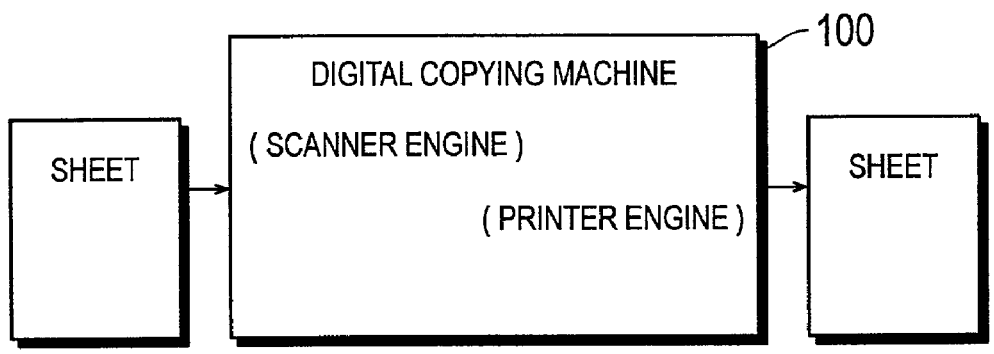
FIG. 16 is an application example of the first embodiment.
Figure 17:
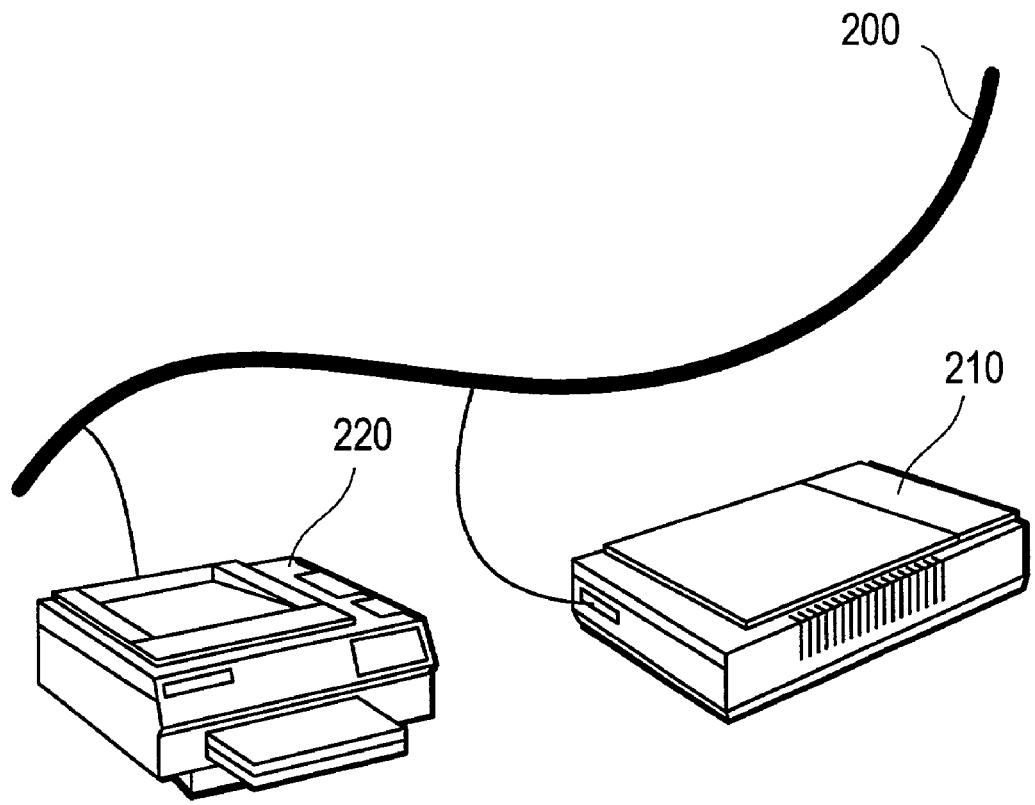
FIG. 17 is a modified version of the first embodiment.

Although it is assumed that the image-processing device according to this invention is applied to a standalone digital copying machine 100 (FIG. 16) in the above description of this embodiment, the invention is not limited to it. For example, it can be applied to a scanner 210 and a printer 220 connected to a network 200 as shown in FIG. 17. The image-processing device according to this invention can be built into either the scanner 210 or the printer 220 in this case.

Several other application examples of this invention is added in the following. The image-processing unit 7 as shown in FIG. 1, is provided in all of the cases described below to receive raster data obtained by scanning graphic images, store and handle the line widths of line graphics, the colors of line graphics, and the colors of enclosed areas surrounded by line graphics extracted from the raster data together with vector data as a package.

(Second Embodiment)

Figure 18:
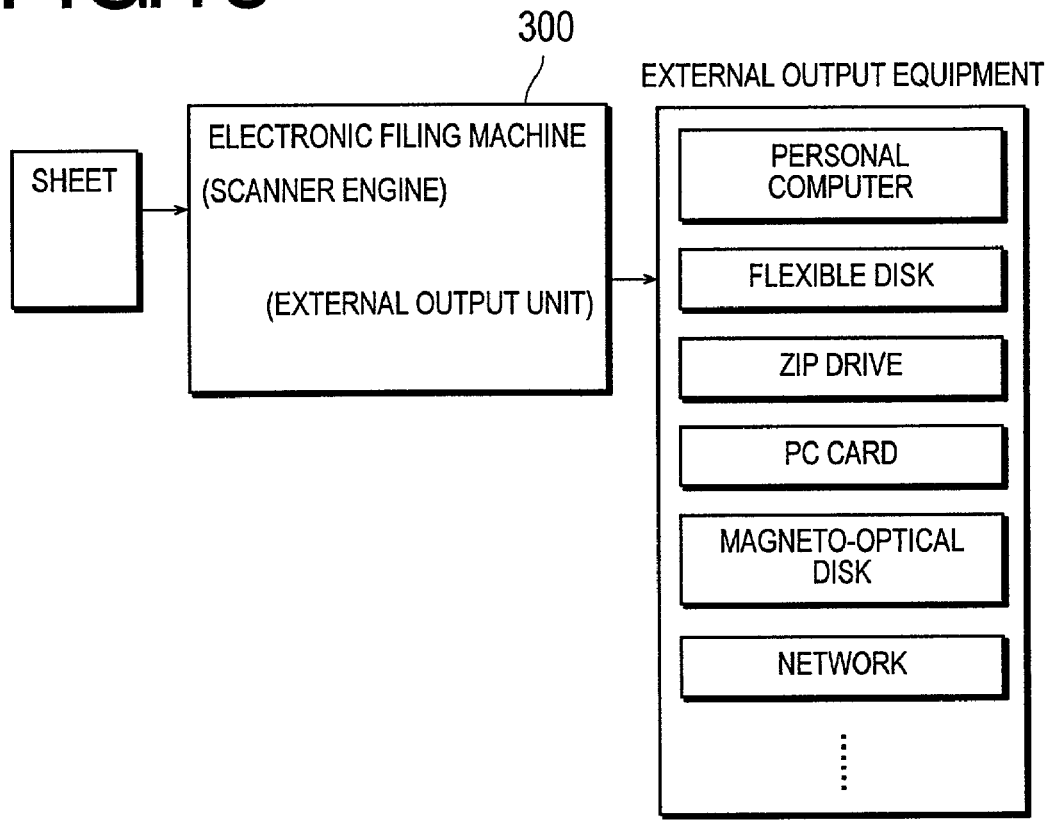
FIG. 18 is a diagram that shows an application example (electronic file preparing machine) of the second embodiment of the present invention.

The example shown in FIG. 18 is a case where the graphics data (vector data) obtained after vector conversion is to be outputted as an electronic file rather than to be printed. In other words, the image-processing corresponding to the second embodiment as shown in FIG. 18 is constituted as an electronic file generator 300, which has the advanced vector conversion function.

The electronic file generator 300 comprises, although not shown in the drawing, a scanner engine, the image-processing unit 7, various external output ports to be connected with external equipment such as notebook type personal computers and/or PDA, removable type memory media, recording media drives to read and write memory media, and a network port to be connected with a network. The external output ports, the recording media drives and the network are jointly called hereinafter as the "external output unit." The external output ports include serial and parallel ports such as USB, IEEE1394, and IEEE1284. The recording media drives include a flexible disk drive, Zip drive, PC card drive, and/or an MO disk drive.

Figure 20:
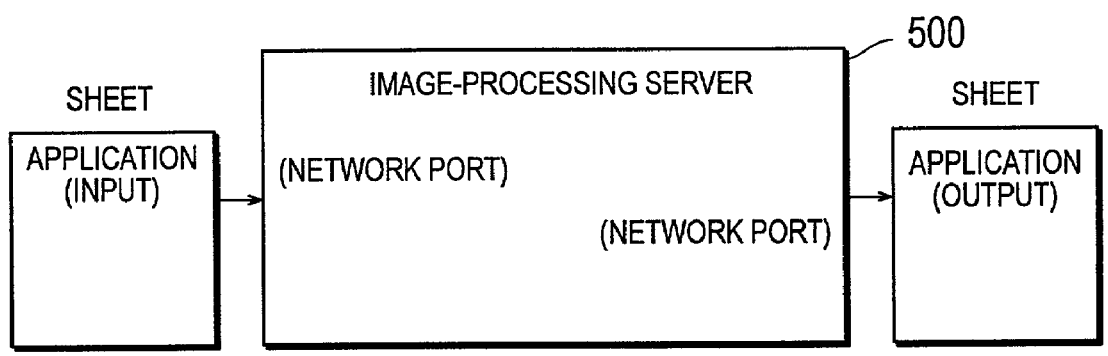
FIG. 20 is a diagram that shows an application example (image-processing server) of the fourth embodiment of the present invention.

The image-processing unit 7 processes the raster data obtained by scanning with a scanner engine. As a result, image data files of specific format (e.g., PDF) are generated (refer to FIG. 3). At this point, information such as line widths and color inside of the enclosed area and vector is stored as an image data file. The image data file generated can be outputted through the external output ports, the recording media drives or the network ports to personal computers, floppy disks, Zip disks, PC cards, MO disks and the network as specified in each circumstance as shown in FIG. 20.

(Third Embodiment)

Figure 19:
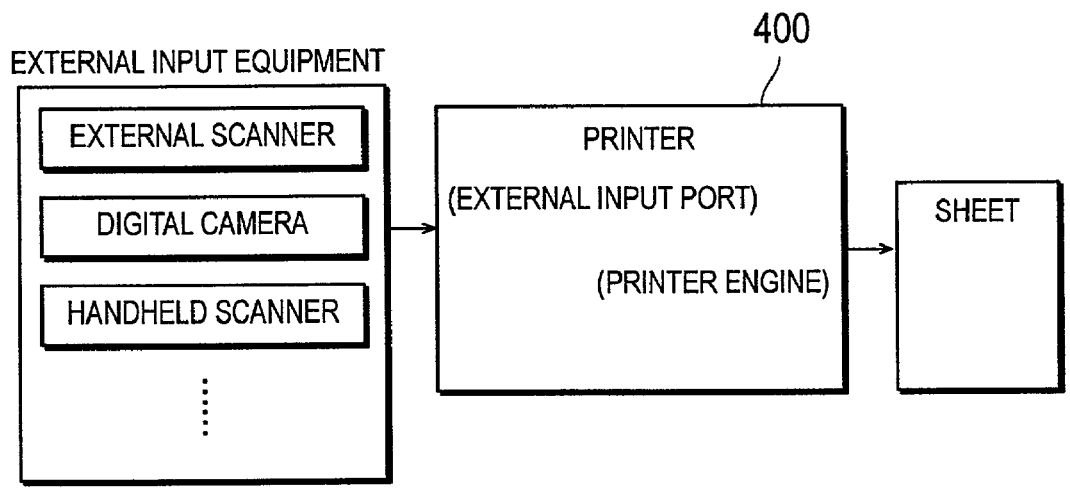
FIG. 19 is a diagram that shows an application example (printer) of the third embodiment of the present invention.

The example shown in FIG. 19 is a case where image data obtained by external equipment are imported instead of directly scanning documents to obtain image data. The image-processing device that corresponds to the third embodiment shown in FIG. 19 is configured as a printer 400 having the advanced vector conversion function.

Although it is not shown in the drawing, the printer 400 is equipped with various external source input ports to be connected to external scanners, digital cameras, hand-held scanners with built-in memory, etc., the image-processing unit 7, and a printer engine. The external source input ports, recording media drive, and network ports are used for receiving image data from the external sources.

Image data obtained by external equipment such as external scanners, digital cameras, hand-held scanners with built-in memory are imported via the external source input ports and are processed by the image-processing unit 7 before being printed by the printer engine.

(Fourth Embodiment)

The example shown in FIG. 20 is a case where image data are received through the network and image-processed by means of the advanced vector conversion function, after which resultant image data files are transmitted via the network to the outside. The image-processing device corresponding to the fourth embodiment shown in FIG. 20 is configured as a server 500 (hereinafter "image-processing server") that provides an image-processing service that includes the advanced vector conversion function to other equipment on the network such as computers.

The image-processing server 500 is equipped with network ports and the image-processing unit 7 (not shown). It is not necessary to input the parameters (e.g., threshold values) required for the advanced vector conversion function and can be inputted from the outside via the network.

The image-processing unit 7 processes image data received through the network ports via the network. As a result, image data files according to the specified formats (e.g., PDF) can be generated (FIG. 3). As shown in FIG. 20, generated image data files are transmitted to the outside again through the network ports via the network. In other words, the server receives image data and necessary parameters from an application (sender) on an arbitrary computer on the network, executes image-processing including the advanced vector conversion function, and transmits back to an arbitrary computer(s) on the network the image data files where not only information concerning line widths and colors of line graphics but also information concerning colors of enclosed areas surrounded by line graphics with vector data as a package.

(Fifth Embodiment)

Figure 21:
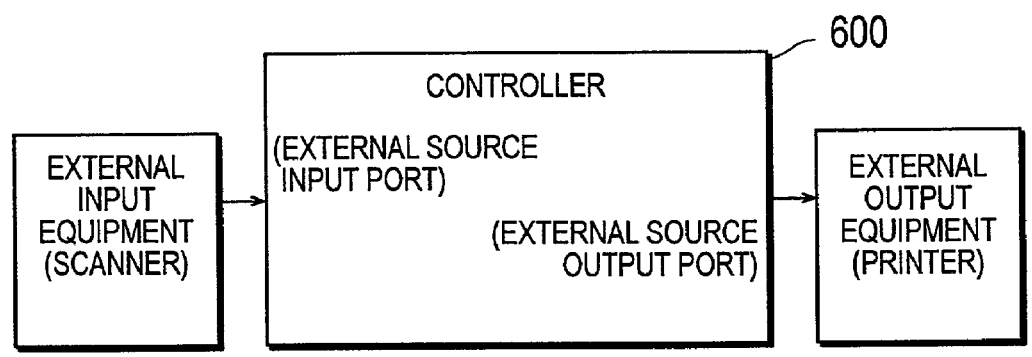
FIG. 21 is a diagram that shows an application example (controller) of the fifth embodiment of the present invention.

The application shown in FIG. 21 is a case where only the image-processing functions are provided including advanced vector conversion function in the main unit without providing a scanner engine or a printer engine, so that external equipment such as a scanner or a printer can be used as necessary. In other words, the image-processing device that corresponds to the fifth embodiment shown in FIG. 21 is configured as a controller 600 equipped with the advanced vector conversion function.

The controller 600 is equipped with external source input ports, the image-processing unit 7, and external source output ports (not shown). The external source input ports and the external source output ports can be input/output ports capable of handling both data input and output. The controller 600 shown here is connected to a scanner as the external source input equipment and a printer as the external source output equipment, wherein the controller 600 functions as a scanner/printer controller.

Image data obtained by scanning a document is imported through the external source input port and processed by means of the image-processing unit 7 to generate an image data file of a specified format (e.g., PDF) (refer to FIG. 3). The image data file thus generated is transmitted to the printer through the external output port as shown in FIG. 21.

The advanced vector conversion function in each embodiment shown above is performed as the CPU and image processor unit execute a specified program where the processing sequence is described (refer to FIG. 3 through FIG. 8) and the program can be provided by computer readable recording media such as a flexible disk and a CR-ROM. The program that is stored in one of those computer readable recording media is normally transferred to the hard disk and installed. The specific program can be provided independently as application software that executes each process mentioned above or can be built into a function of the devices 100 through 600 in the software of the devices 100 through 600. The program product claimed includes the program itself, the recording media that stores the program, and devices that operate based on the program installed in them.

What is claimed is:

1. An image-processing apparatus comprising:
    a memory that stores raster data obtained by scanning a graphic image; and
    a processor connected to said memory; wherein
    said processor extracts line graphics based on the raster data;
    said processor generates vector data along the extracted line graphics;
    said processor detects information concerning line widths of the extracted line graphics; and
    said processor extracts an enclosed area surrounded by the extracted line graphics; and
    said processor detects first information concerning a color within the extracted enclosed area, and detects second information concerning a color of the line graphics.

2. The image-processing apparatus according to the claim 1, further comprising:
    a storage unit that stores said vector data and said information concerning the color within the enclosed area.

3. The image-processing apparatus according to the claim 2, wherein said storage unit further stores said information concerning the line widths.

4. The image-processing apparatus according to the claim 1, wherein said processor selects multiple internal points within the extracted enclosed area and detects the color within the extracted enclosed areas based on color information of the multiple internal points.

5. The image-processing apparatus according to the claim 4, wherein said processor generates a histogram of the color information of the multiple internal points and executes statistical processes based on the histogram to detect color within the extracted enclosed area.

6. The image-processing apparatus according to the claim 2, wherein said storage unit further stores said second information concerning the color of said line graphics.

7. The image-processing apparatus according to the claim 1, wherein said vector data are generated by converting the line graphics into core line graphics.

8. The image-processing apparatus according to the claim 1, wherein said processor compares the line widths of the line graphics with a specified threshold value and generates said vector data according to comparison results.

9. The image-processing apparatus according to the claim 1, wherein said image processing apparatus is built into a scanner.

10. The image-processing apparatus according to the claim 1, wherein said image processing apparatus is built into a server that provides image-processing services.

11. The image-processing apparatus according to the claim 1, wherein said image processing apparatus is built into a printer.

12. An image-processing method comprising the steps of:
    receiving raster data obtained by scanning a graphic image;
    extracting line graphics based on the raster data;
    generating vector data along the extracted line graphics;
    detecting information concerning line widths of the extracted line graphics;
    extracting an enclosed area surrounded by the extracted line graphics; and
    detecting first information concerning a color within the extracted enclosed areas and detecting second information concerning a color of the line graphics.

13. An image-processing method comprising the steps of:
    receiving raster data obtained by scanning a graphic image;
    extracting line graphics based on the raster data;
    generating vector data along the extracted line graphics;
    detecting information concerning line widths and a color within the extracted line graphics;
    extracting an enclosed area surrounded by the extracted line graphics;
    detecting first information concerning a color within the extracted enclosed area, detecting second information concerning a color of the line graphics; and
    storing said vector data, information concerning the line widths and the color of the line graphics, and information concerning the color within the enclosed area.

14. The image-processing method according to claim 13, wherein said vector data are generated by converting the line graphics into core line graphics.

15. The image-processing method according to the claim 13, further comprising the step of comparing the line widths of the line graphics with a specified threshold value;
    wherein said vector data are generated according to comparison results.

16. A computer readable medium containing a program for image processing, said program for causing a computer to execute the procedures of:
receiving raster data obtained by scanning a graphic image;
extracting line graphics based on the raster data;
generating vector data along the extracted line graphics;
detecting information concerning line widths of the extracted line graphics;
extracting an enclosed area surrounded by the extracted line graphics; and
detecting first information concerning a color within the extracted enclosed area, and detecting second information concerning a color of the line graphics.

17. A computer readable medium containing a program for image processing, said program for causing a computer to execute the procedures of:
receiving raster data obtained by scanning a graphic image;
extracting line graphics based on the raster data;
generating vector data along the extracted line graphics;
detecting information concerning line widths and a color within the extracted line graphics;
extracting an enclosed area surrounded by the extracted line graphics;
detecting first information concerning a color within the extracted enclosed area, detecting second information concerning a color of line graphics; and
storing said vector data, information concerning the line widths and the color of the line graphics, and information concerning the color within the enclosed area.

18. An image processing apparatus comprising:
a processor for generating a set of data from raster image data including line graphics that form an area surrounded by the line graphics, the set of data including (1) vector data generated along each axis of the line graphics, (2) information on line widths of the line graphics, (3) information on a first color of the line graphics, and (4) information on a second color of the enclosed area.

19. The image processing apparatus of claim 18, wherein the processor selects a plurality of internal points within the area and detects the second color based on color information of the plurality of internal points.

20. The image processing apparatus of claim 19, wherein the processor generates a histogram of the color information of the plurality of internal points.

21. The image processing apparatus of claim 18, wherein the processor generates the vector data by converting the line graphics into core line graphics.

22. The image processing apparatus of claim 18, wherein the processor compares the line widths of the line graphics with a specified threshold value and generates the vector data according to the comparison results.

23. An image processing method for generating a set of data from raster image data including line graphics that form an area surrounded by the line graphics, the set of data including (1) vector data generated along each axis of the line graphics, (2) information on line widths of the line graphics, (3) information on a first color of the line graphics, and (4) information on a second color of the enclosed area.

24. The image processing method of claim 23, wherein the processor selects a plurality of internal points within the area and detects the second color based on color information of the plurality of internal points.

25. The image processing method of claim 24, wherein the processor generates a histogram of the color information of the plurality of internal points.

26. The image processing method of claim 23, wherein the processor generates the vector data by converting the line graphics into core line graphics.

27. The image processing method of claim 23, wherein the processor compares the line widths of the line graphics with a specified threshold value and generates the vector data according to the comparison results.

28. A computer readable medium having a computer program for image processing, the computer program causing a computer to carry out a procedure for generating a set of data from raster image data including line graphics that form an area surrounded by the line graphics, the set of data including (1) vector data generated along each axis of the line graphics, (2) information on line widths of the line graphics, (3) information on a first color of the line graphics, and (4) information on a second color of the enclosed area.

29. The recordable medium of claim 28, wherein the processor selects a plurality of internal points within the area and detects the second color based on color information of the plurality of internal points.

30. The recordable medium of claim 29, wherein the processor generates a histogram of the color information of the plurality of internal points.

31. The recordable medium of claim 28, wherein the processor generates the vector data by converting the line graphics into core line graphics.

32. The recordable medium of claim 28, wherein the processor compares the line widths of the line graphics with a specified threshold value and generates the vector data according to the comparison results.

* * * * *